(12) United States Patent
Robertson et al.

(10) Patent No.: US 9,832,135 B2
(45) Date of Patent: Nov. 28, 2017

(54) APPARATUS FOR MANAGING DATA QUEUES IN A NETWORK

(71) Applicant: BAE SYSTEMS INFORMATION AND ELECTRONIC SYSTEMS INTEGRATION INC., Nashua, NH (US)

(72) Inventors: Jeffrey E. Robertson, Ashburn, VA (US); Dale A. Rickard, Manassas, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 103 days.

(21) Appl. No.: 14/921,425

(22) Filed: Oct. 23, 2015

(65) Prior Publication Data

US 2016/0234128 A1 Aug. 11, 2016

Related U.S. Application Data

(60) Provisional application No. 62/067,723, filed on Oct. 23, 2014.

(51) Int. Cl.
| | | |
|---|---|---|
| *H04L 12/863* | (2013.01) | |
| *H04L 12/873* | (2013.01) | |
| *H04L 12/861* | (2013.01) | |
| *H04L 12/865* | (2013.01) | |

(52) U.S. Cl.
CPC .......... *H04L 47/6295* (2013.01); *H04L 47/52* (2013.01); *H04L 47/6215* (2013.01); *H04L 47/6275* (2013.01); *H04L 49/90* (2013.01)

(58) Field of Classification Search
CPC ......... H04L 47/10; H04L 47/24; H04L 47/50; H04L 47/52; H04L 47/562; H04L 47/6215; H04L 47/6275; H04L 47/6295; H04L 49/90
See application file for complete search history.

(56) References Cited

U.S. PATENT DOCUMENTS

| | | | | |
|---|---|---|---|---|
| 4,864,532 A | * | 9/1989 | Reeve ................... | G06F 3/0601 710/53 |
| 6,912,225 B1 | * | 6/2005 | Kohzuki ............ | H04L 12/5693 370/236 |
| 6,976,083 B1 | * | 12/2005 | Baskey ................... | H04L 67/02 709/216 |
| 7,231,455 B2 | * | 6/2007 | Marejka ................. | H04L 47/22 709/230 |
| 7,333,435 B2 | * | 2/2008 | Gerkis ................ | H04L 47/6215 370/230.1 |
| 7,546,367 B2 | * | 6/2009 | Mahdavi ................ | H04L 47/10 370/230 |
| 7,616,642 B2 | * | 11/2009 | Anke ...................... | H04L 47/10 370/235 |

(Continued)

*Primary Examiner* — Alpus H Hsu
(74) *Attorney, Agent, or Firm* — Russell Ng PLLC

(57) ABSTRACT

An apparatus for managing data queues is disclosed. The apparatus includes at least one sensor for collecting data, a data interface for receiving data from the sensor(s) and for placing the collected data in a set of data queues, and a priority sieve for organizing the set of data queues according to data priority of a specific task. The priority sieve includes a scoreboard for identifying queue priority and a system timer for synchronization.

7 Claims, 8 Drawing Sheets

(56) References Cited

U.S. PATENT DOCUMENTS

| | | | | |
|---|---|---|---|---|
| 7,672,303 | B1* | 3/2010 | Baxter | H04L 49/205 370/389 |
| 7,801,092 | B2* | 9/2010 | Meier | H04W 28/14 370/230.1 |
| 7,974,297 | B2* | 7/2011 | Jing | H04L 47/10 370/412 |
| 7,983,295 | B2* | 7/2011 | Cummings | H04L 49/90 370/412 |
| 8,248,945 | B1* | 8/2012 | Sathe | H04L 47/13 370/235 |
| 2002/0027924 | A1* | 3/2002 | Fukushima | H04L 41/5022 370/401 |
| 2003/0048797 | A1* | 3/2003 | Sandstrom | H04J 3/1682 370/402 |
| 2003/0182464 | A1* | 9/2003 | Hamilton | G06F 9/546 719/314 |
| 2013/0201825 | A1* | 8/2013 | Masputra | H04L 47/60 370/230 |
| 2013/0215850 | A1* | 8/2013 | Zakrzewski | H04W 52/0261 370/329 |
| 2014/0036680 | A1* | 2/2014 | Lih | H04L 47/12 370/235 |

* cited by examiner

APPARATUS FOR MANAGING DATA QUEUES IN A NETWORK

PRIORITY CLAIM

The present application claims priority under 35 U.S.C. §119(e)(1) to provisional application No. 62/067,723, filed on Oct. 23, 2014, the contents of which are incorporated herein by reference.

STATEMENT OF GOVERNMENT INTEREST

The present invention was made with United States Government assistance under Contract No. 13-C-0007 awarded by a government customer. The United States Government has certain rights in the present invention.

BACKGROUND OF THE INVENTION

1. Technical Field

The present invention relates to data queue management within a network in general, and in particular to an apparatus for managing distributed data queues within a network.

2. Description of Related Art

Demands for high-performance on-board processing are increasing due to large amount of data stemmed from improvements in sensor resolution, sensor bandwidth and the number of sensors integrated into a single platform. New processing capabilities are being introduced through field programmable gate arrays, digital signal processors and multi-core general purpose system-on-chip processors. Along with the improved on-board processing throughput, higher performance communications network infrastructure at the chassis backplane and local-area network (LAN) levels is being developed to transport data. However, improved sensors and groups of sensors can still generate data at rates that far exceed the instantaneous data processing and/or off-board communications rates provided by a platform such as a spacecraft.

For example, current spacecraft typically use MIL-STD-1553B bus (1 Mb/s), SpaceWire (less than 400 Mb/s) and/or peripheral component interface (PCI) bus (1 Gb/s to 2 Gb/s) to handle intra-subsystem or LAN communications across a backplane. The data rates provided by the above-mentioned interfaces are generally not sufficient to support on-board processing needs for systems in new spacecraft.

Next Generation Spacecraft Interconnect Standard (NG-SIS) standardization efforts under AIAA, RapidIO and VITA standards umbrellas have developed SpaceVPX (VITA 78) standard, which defines a fault-tolerant version of Open-VPX® (VITA 65) suitable for high performance backplanes in space applications. SpaceVPX employs RapidIO data plane, SpaceWire control plane and I2C utility plane in either a mesh or switch connected backplane structure, which can support aggregate bandwidth exceeding 200 Gb/s. Combined with RapidIO LAN for inter-subsystem communication, the above-mentioned new standard provides the framework for dramatic increases in on-board communications bandwidth needed to support high data rate sensors and tera-FLOPS processing capability. While such on-board processing capability helps to reduce communications bandwidth requirements between downstream processing elements or downlinks, the resulting processed data and required supporting raw data can still exceed the processing capability and/or downlink bandwidth available. Thus, there is a need to provide data storage, rate controlled delivery of stored data to communications links and selection of the data to be delivered based on priority and time of arrival.

SUMMARY OF THE INVENTION

The present disclosure provides a configurable apparatus for supporting high data rate sensors with a data recorder function that provides priority and time-based data rate control using single or multiple node data storage.

In accordance with a preferred embodiment of the present invention, an apparatus for managing data queues includes at least one sensor for collecting data, a data interface for receiving data from the sensor or sensors and for placing the collected data in a set of data queues, and a priority sieve for organizing the set of data queues according to data priority of a specific task. The priority sieve includes a scoreboard for identifying queue priority. When a single card with a single apparatus is not physically possible, for example, due to input bandwidth, storage capacity or other constraints, multiple independent priority sieves are required, and a timing control circuit is utilized to chain the multiple independent priority sieves into a single data queue control entity. Chaining is required when hardware constraints prevent one instance of the apparatus from managing all data queues. In that case, multiple nodes appear as a single node to a communications network.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
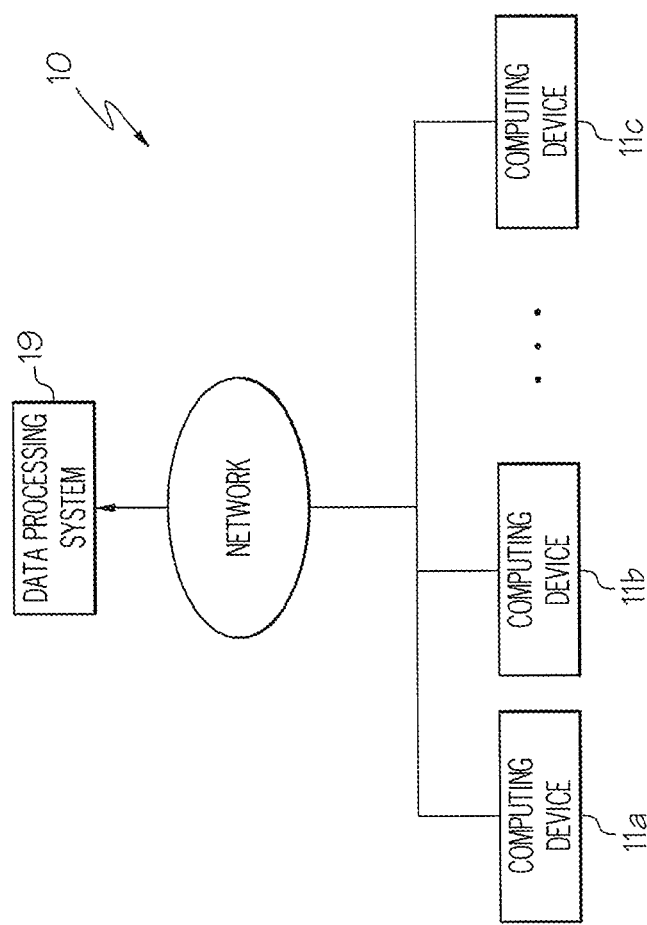
FIG. 1 is a block diagram of a data handling environment in which a preferred embodiment of the present invention can be incorporated.

Referring now to the drawings and in particular to FIG. 1, there is illustrated a block diagram of a data handling environment in which a preferred embodiment of the present invention can be incorporated. As shown, a data handling environment 10 includes a data processing system 19 and computing devices 11a-11n. Each of computing devices 11a-11n operates separately and independently to collect data. Data collected by computing devices 11a-11n are transmitted to data processing system 19 via a network. Although computing devices 11a-11n are located in separate hardware, computing devices 11a-11n are synchronized with each other via a timing mechanism. When the amount of data collected by computing devices 11a-11n is greater than the data processing throughput of the network, the collected data can be segregated into different priority queues such that the highest priority data will be sent to data processing system 10 first, followed by lower priority data. Computing devices 11a-11n are substantially identical to each other, and only computing device 11a will be further described in details.

Figure 2:
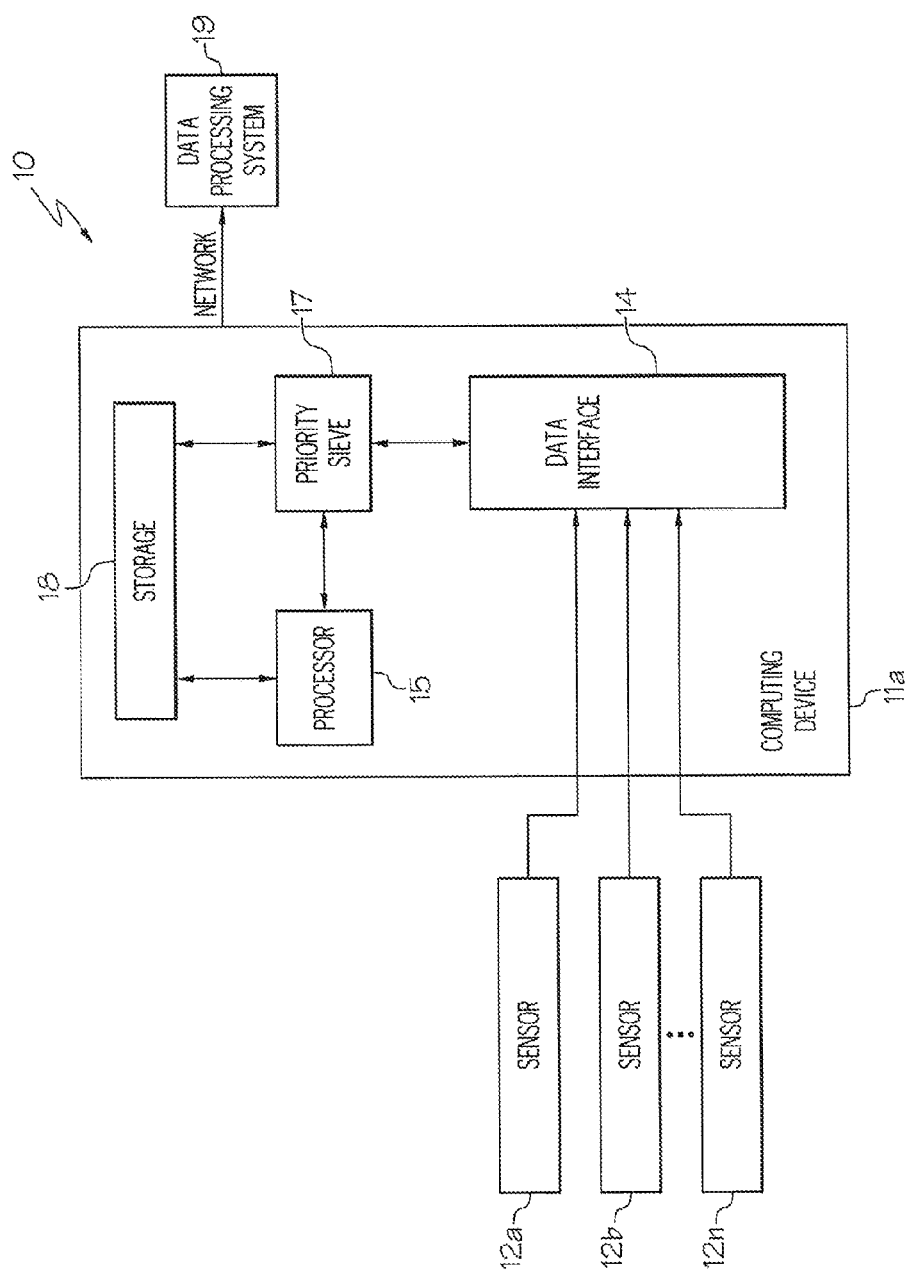
FIG. 2 is a block diagram of a computing device within the data handling environment from FIG. 1, in accordance with a preferred embodiment of the present invention.

With reference now to FIG. 2, there is depicted a detailed block diagram of computing device 11a, in accordance with a preferred embodiment of the present invention. As shown, computing device 11a includes a data interface 14, a processor 15, a priority sieve 17 and a storage device 18. Computing device 11a also includes sensors 12a-12n for collecting data. The type of data being collected depends on the type of sensors being used. Examples of sensors 12a-12n include imagers, radio-frequency receivers, antenna elements, sonar array elements, etc.

Both raw sensor data and processed data may have various levels of priority, and the data needs to be prioritized and stored until processing resources have sufficient bandwidth to operate on the data or until a communications link has sufficient bandwidth available to relay the data onward to the next processing resource such as data processing system 19 from FIG. 1. Furthermore, data types from the same or different sensors may have different levels of importance or requirements for timeliness of delivery. Thus, data collected by computing device ha can be placed in respective queues depending on their respective priorities. Priority sieve 17 is utilized to provide queue management. Since computing devices 11a-11n work in concert, priority sieve 17 in computing device 11a also "join" priority sieves in computing devices 11b-11n to form a single priority sieve.

Figure 3:
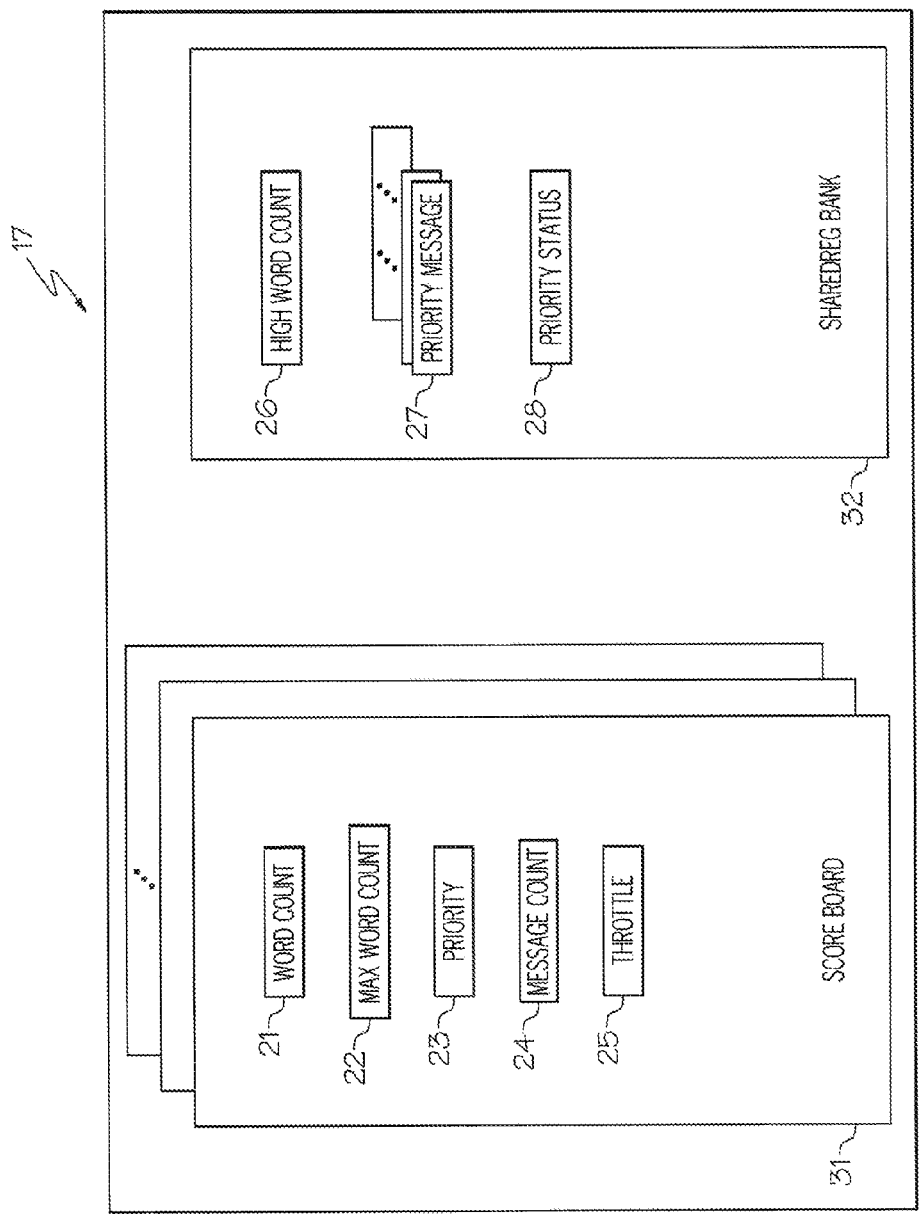
FIG. 3 is a block diagram of a priority sieve within the computing device from FIG. 2, in accordance with a preferred embodiment of the present invention.

Referring now to FIG. 3, there is depicted a detailed block diagram of priority sieve 17 within computing device 11a from FIG. 2, in accordance with a preferred embodiment of the present invention. As shown, priority sieve 17 includes a Scoreboard 31 and a SharedReg Bank 32. Scoreboard 31 includes multiple pages, and each page contains a set of registers to be associated with a data queue. Preferably, each page includes registers such as a Word Count register 21, a Max Word Count register 22, a Priority register 23, a Message Count register 24 and a Throttle register 25.

Word Count register 21 stores the total number of words (or other unit of measure, such as bytes, double words, etc.) currently stored in an associated data queue. The value in Word Count register 21 is incremented when entries are added to the associated data queue, and decremented when entries are removed from the associated data queue.

Max Word Count register 22 stores a value set by software that controls the setting of a High Word Count register 26 in SharedReg Bank 32 for an associated data queue.

Priority register 23 stores a priority of an associated data queue that is set by software.

Message Count register 24 stores the number of entries in an associated data queue. The value in Message Count register 24 is incremented when entries are added to the associated data queue, and decremented when entries are removed from the associated data queue.

Throttle register 25 is a count down timer (preferably stops at 0) set by software that controls whether or not a queue updates the register of SharedReg Bank 32. If the timer is zero, a register within Priority Message registers 27 in SharedReg Bank 32 for an associated data queue is updated based on the settings of Priority register 23 and Message Count register 24. Throttle register 25 is utilized to control rate of individual queue data acceptance (storage) or transmission (readout) within a single computing device (e.g., computing device 11a).

SharedReg Bank 32 contains a synopsis of the contents of Scoreboard 31. Preferably, SharedReg Bank 32 includes High Word Count register 26, a set of Priority Message registers 27 and a Priority Status register 28. High Word Count register 26, Priority Message registers 27 and Priority Status register 28 are referenced by software to determine which data queues need to be serviced.

Each bit of High Word Count register 26 corresponds to a data queue. The bit is 0 when an associated data queue's Word Count Register 21 in Scoreboard 31 is less than or equal to the associated data queue's Max Word Count register 22.

Each of Priority Message registers 27 corresponds to a priority level. For example, if Priority Sieve 17 has 32 priority levels, then there will be 32 Priority Message registers 27, each corresponding to one of the 32 priority levels. In addition, each register within Priority Message registers 27 has one bit for each data queue. When a queue's associated Message Count register 24 in Scoreboard 31 is greater than zero and Throttle register 25 is equal to zero, the queue's bit in Priority Message register 27 assigned the value in the queue's Priority register 23 is set to 1, in all other cases, it is set to 0.

Each priority level has one bit in Priority Status register 28. If any of the bits in Priority Message registers 27 for the corresponding priority level is one, then the corresponding bit in Priority Status register 28 is set to 1; otherwise, it is set to 0.

During system initialization, software sets the Max Word Count register 22 and Priority register 23 for each data queue. Word Count register 21 and Message Count register 24 are set to 0. The result is that all bits in SharedReg Bank 32 are 0.

Figure 4A:
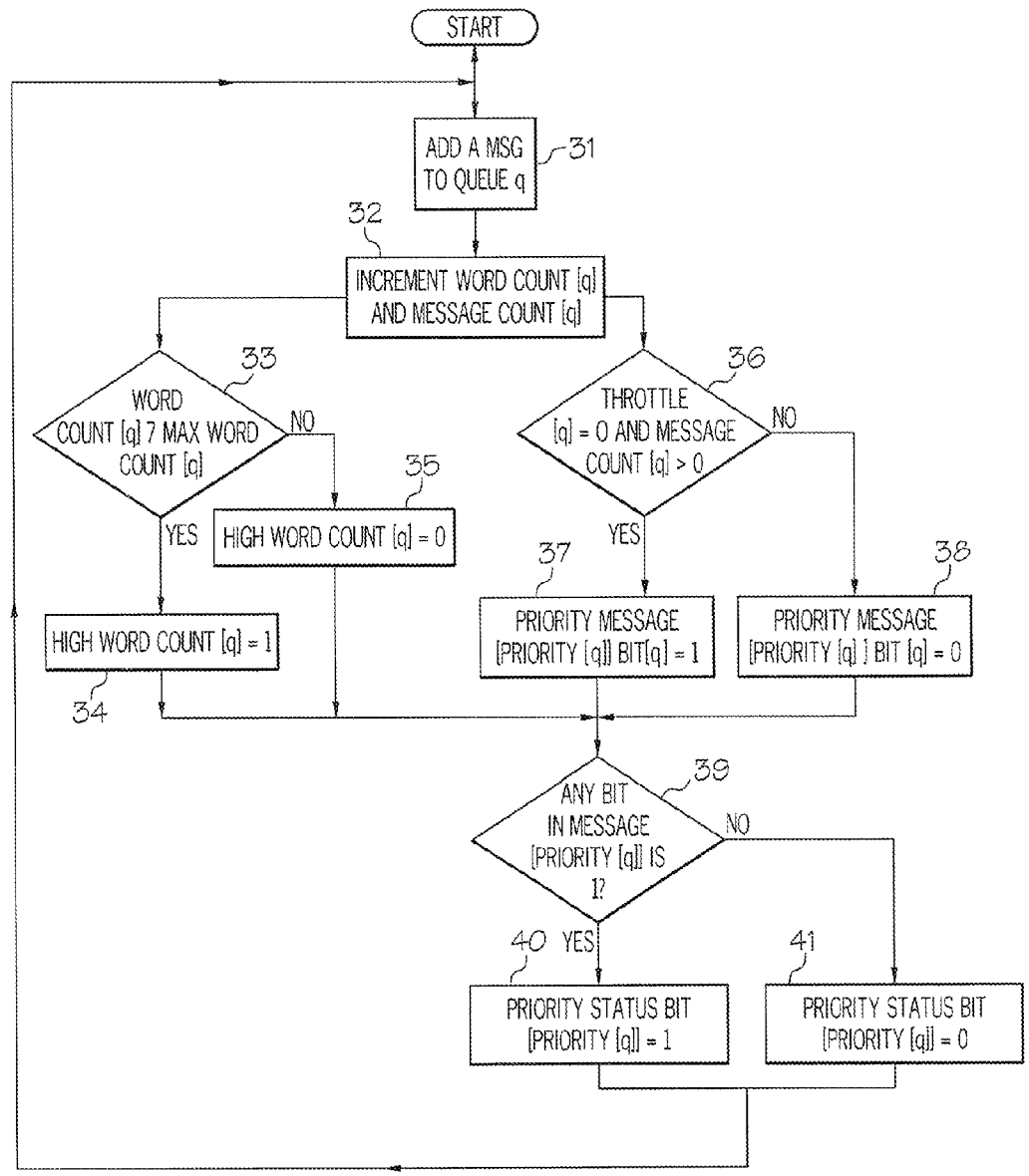
FIGS. 4a-4c are flow diagrams of a method for handling queues by the priority sieve from FIG. 3, in accordance with a preferred embodiment of the present invention.
Figure 4B:
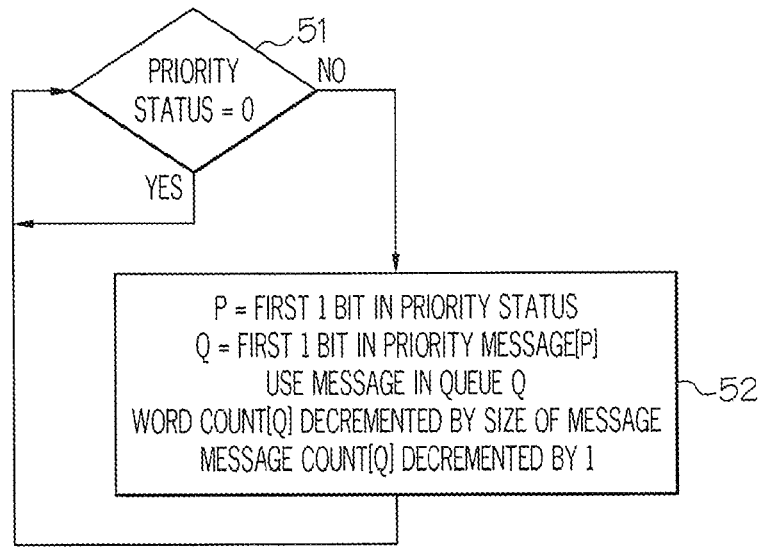
Figure 4C:
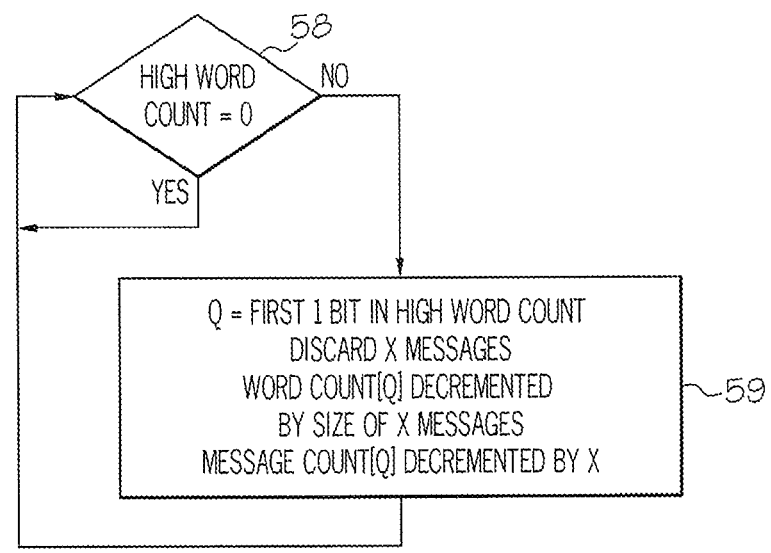

With reference now to FIGS. 4a-4c, there are illustrated flow diagrams of a method for handling data queues by priority sieve 17, in accordance with a preferred embodiment of the present invention. The process begins in response to a change to Word Count, Message Count, Throttle, Max Word Count or Priority, typically caused by the detection of an object by one of sensors 12a-12n from FIG. 2, and a message is then added to queue q, wherein q is an integer, as shown in block 31 of FIG. 4a, Register Word Count[q] is incremented by the size of the object placed in queue q, and register Message Count[q] is incremented accordingly, as depicted in block 32.

A determination is then made whether or not the value in register Word Count[q] is greater than the value in register Max Word Count[q], as shown in block 33. If the value in register Word Count[q] is greater than the value in register Max Word Count[q], register High Word Count bit[q] is set to 1, as depicted in block 34; otherwise, register High Word Count bit[q] is set to 0, as shown in block 35.

Concurrent with the determination step in block 33, another determination is made whether or not the value in register Throttle[q] equals zero, and the value in register Message Count[q] is greater than zero, as depicted in block 36. If the value in register Throttle[q] equals zero, and the value in register Message Count[q] is greater than zero, then register Priority Message[Priority[q]] bit[q] is set to 1, as shown in block 37; otherwise, register Priority Message [Priority[q]] bit[q] is set to 0, as shown in block 38.

Another determination is made whether or not any hit in register Message [Priority[q]] bit[q] is a logical 1, as shown in block 39. If any bit in register Message [Priority[q]] bit[q] is a logical 1, register Priority Status bit[Priority[q]] is set to 1, as depicted in block 40; otherwise, register Priority Status bit[Priority[q]] is set to 0, as shown in block 41. Subsequently, the process returns to block 31.

Priority Status register is monitored via polling or interrupts. A determination is made whether or not the value of the Priority Status register equals zero, as shown in block 51 of FIG. 4b. If the value of the Priority Status register equals zero, the process returns to block 51; otherwise, P=first bit in the Priority Status register, Q=first bit in the Priority Message register[P], the message in queue Q is then utilized, register Word Count[Q] is decremented by the size of the message, and Message Count[Q] is decremented by 1, as depicted block 52.

High Word Count register is monitored via polling or interrupts. A determination is made whether or not the value of the High Word Count register equals zero, as shown in block 58 of FIG. 4c. If the value of the High Word Count register equals zero, the process returns to block 58; otherwise, Q=first bit in the High Word Count register, certain x messages in queue Q are discarded, register Word Count[Q] is decremented by the size of x messages, and Message Count[Q] is decremented by x, as depicted in block 59.

Figure 5:
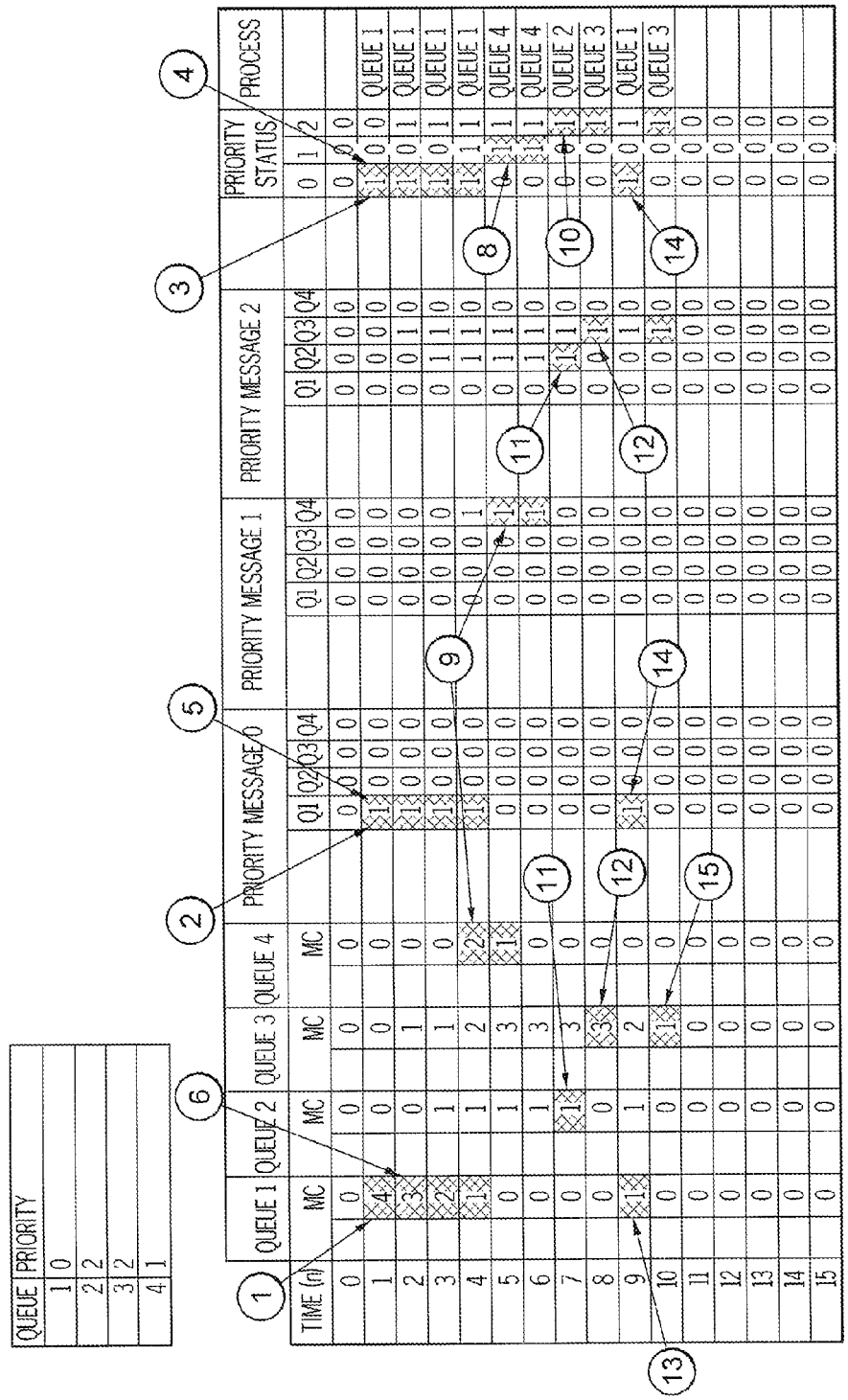
FIG. 5 illustrates an example of queue handling by the priority sieve from FIG. 3.

Referring now to FIG. 5, there is illustrated an example of queue handling, in accordance with a preferred embodiment of the present invention. Four priority queues are shown in this example, and a higher priority queue has a lower priority number. If two priority queues have the same priority, the higher priority queue has a lower priority queue ID.
  (1) At time period 0, four messages show up on queue 1 having a priority of 0.
  (2) The hardware of priority sieve 17a then sets queue 1 bit in the Priority Message[0] register and the priority 0 bit in the Priority Status Message.
  (3) The software of priority sieve 17a reads Priority Status; and
  (4) detects that a Priority 0 queue is highest priority active.
  (5) The software of priority sieve 17a reads Priority Message[0] and realizes that queue 1 contains data and processes that queue.
  (6) Additional messages show up in queues 2, 3 and 4, but queue 1 is still the highest priority queue so processing stays with queue 1.
  (7) The hardware records the priority in the Priority Message and Priority Status registers.
  (8) At time period 5, the last entry in queue 0 is processed. Since queue 1 now has no members, the highest priority becomes priority 1.
  (9) Queue 4 at priority 2 becomes the highest priority queue, and processing begins on that queue.
  (10) At time period 7, queue 4 becomes empty, and Priority Message group 2 becomes the highest priority queue group.
  (11) Within Priority Message group 2, both queue 2 and queue 3 contain data. Since queue 2 has the lowest queue number, queue 2 becomes the queue with the highest priority.
  (12) At time period 8, queue 2 is empty, queue 3 contains data and is in Priority Group 2, so queue 3 becomes the active queue.
  (13) At time period 9, a new entry is added to queue 1.
  (14) Since it is a priority 0 queue, queue 1 now becomes the highest priority active queue.
  (15) At time period 10, queue 1 is again empty, so processing continues with queue 3.

Data storage requirements for queues, network bandwidth, card size, power/thermal concerns are some examples that can limit the usage of one computing device. Thus, in many applications, it is not practical for a single computing device to take on the entire task of managing data queues. In those cases, a system timer is utilized to support the management of data storage and retrieval from physically distributed priority queues while maintaining time of data arrival order.

Figure 6:
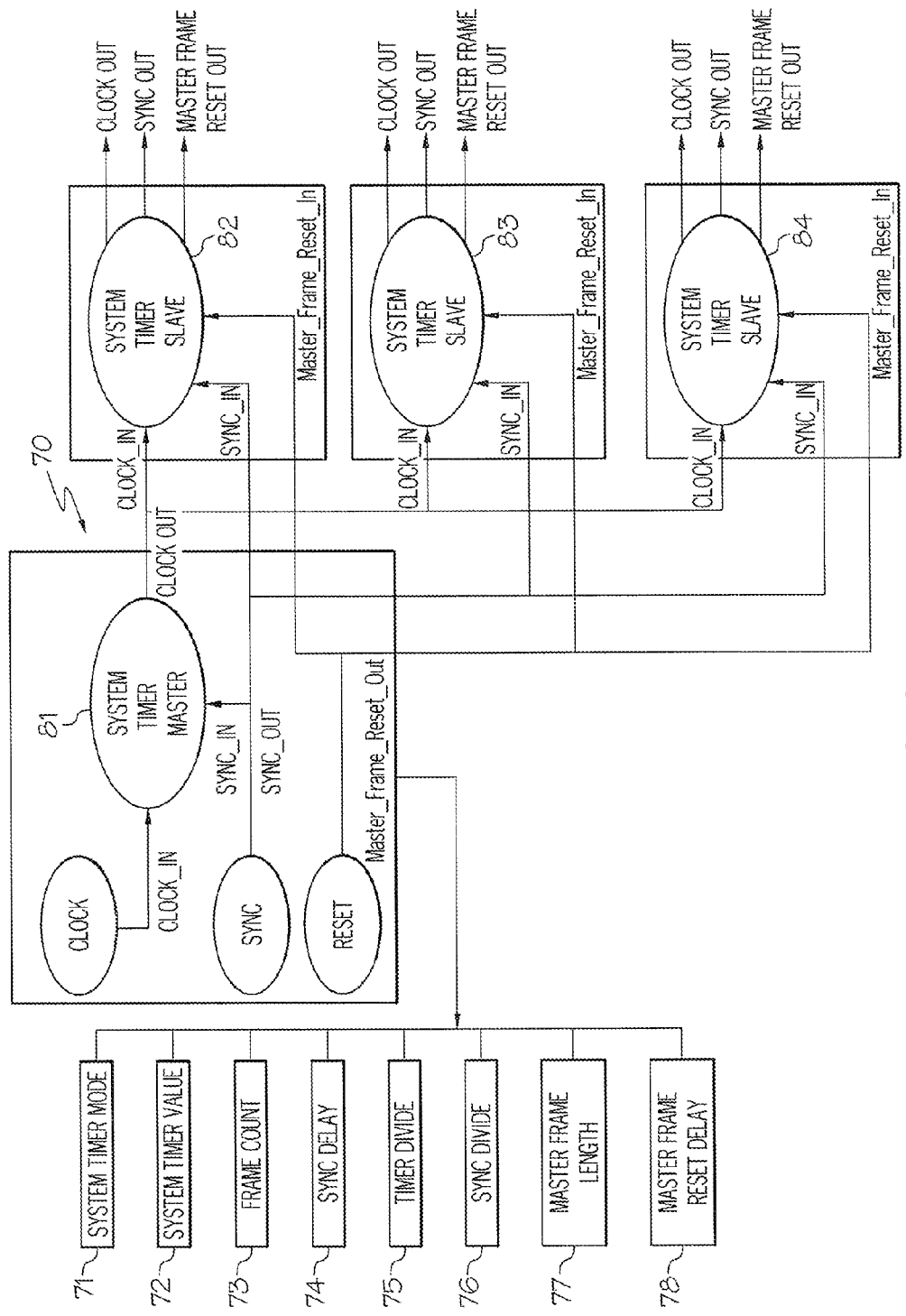
FIG. 6 is a block diagram of a set of system timers for maintaining time of data arrival order and for managing multiple priority queues distributed across four computing devices of the data handling environment from FIG. 1.

With reference now to FIG. 6, there is depicted a block diagram of a set of system timers for maintaining time of data arrival order and for managing multiple priority queues. As shown, a set of system timers includes one system timer master 81 and three system timer slaves 82-84. Although three system timer slaves are shown in FIG. 6, it is understood by those skilled in the art that any number of system timer slaves can be used. Each of system timers 81-84 has a System Timer Value register 72, a Sync Delay register 74 and a Sync Divide register 76. Optionally, each of system timers 81-84 has a System Timer Mode register 71, a Frame Count register 73, a Timer Divide register 75, a Master Frame Length register 77 and a Master Frame Reset Delay register 78. A Clock_Out, Sync_Out and optional Master_Frame_Reset_Out signals are distributed directly from system timer master 81 to each of system timer slaves 82-84. Redrive and buffer circuits can optionally be used between system timer master 81 and slaves 82-84. By using Sync Delay register 74 and Master Frame Reset Delay register 78, the timing of the distribution paths from system timer master 81 to each of system timer slaves 82-84 do not have to be matched. The signal distribution can be broadcast with equal or unequal delays in each path. The signal distribution can also be bussed or daisy-chained. The Clock_In signal can act as a conventional clock signal or can be sampled using a higher frequency clock to generate an asynchronous boundary between the Clock_In signal and any other clock domains within system timers 81-84.

The value of a Sync Delay register 76 is calculated based on the propagation delay from a sync source to a sync destination, and is used to equalize the time that the various system timers are incremented across the system. The delay is calculated during system design and/or test and can be adjusted during system operation based on environmental factors and/or system aging. Preferably, system timer master 81 has the largest countdown timer delay value and system timer slaves 82-84 have some smaller countdown timer delay value based on the propagation delay from system timer master 81 to system timer slaves 82-84. The values of system timer slaves 82-84 are calculated to have all Frame Count registers 73 in system timer master 81 and system timer slaves 82-84 to be incremented at the same time.

Figure 7:
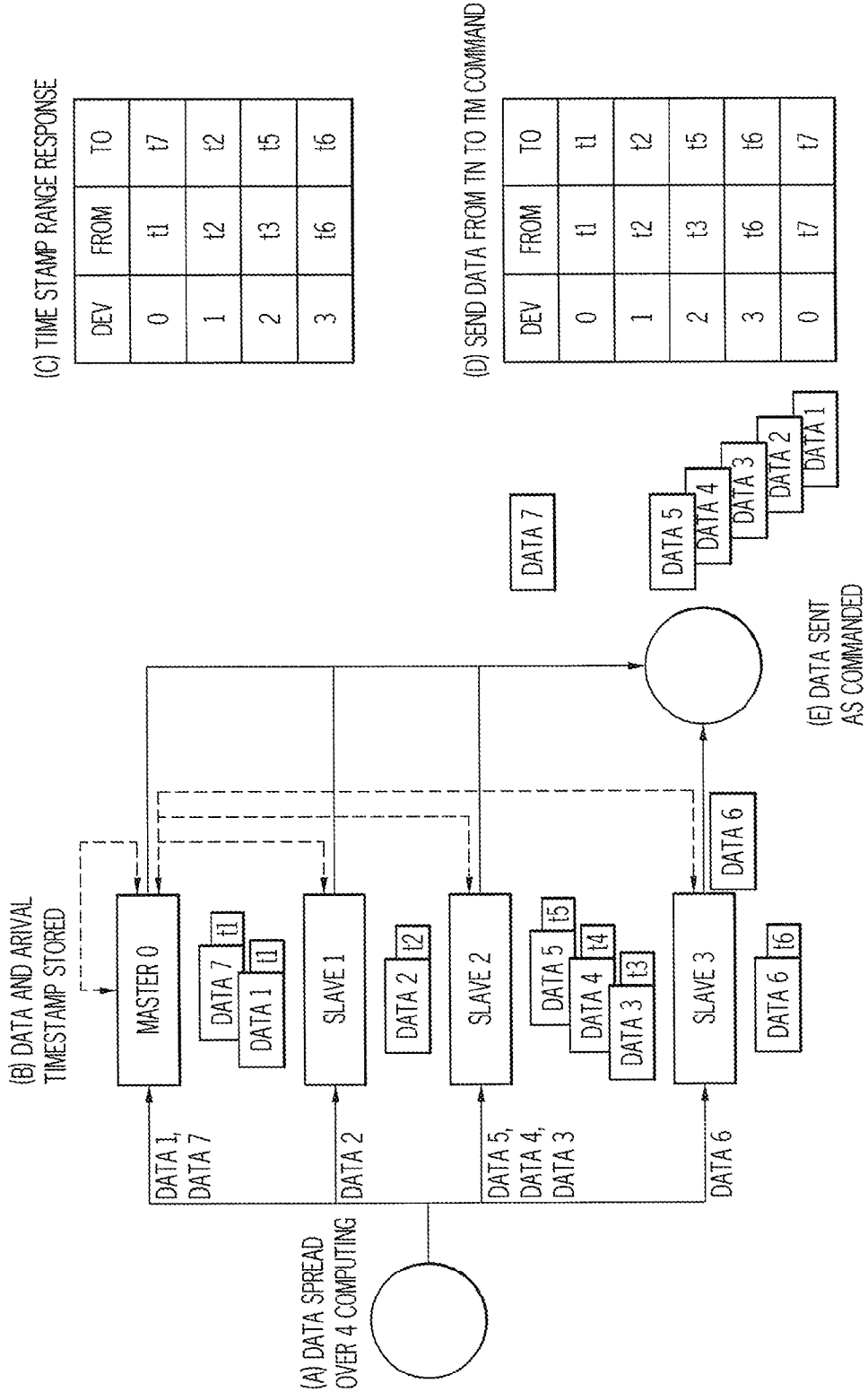
FIG. 7 is an example of data being spread across four computing devices of the data handling environment from FIG. 1.

Referring now to FIG. 7, there is illustrated an example of data being spread across four of computing devices 11a-11n (from FIG. 1). Each of the four computing devices has a system timer such as system timer master 81 or system timer slave 82 and all system timers are synchronized to a master timing signal that may come from one of the computing devices operating in master mode or from some other device that acts substantially as a master mode system timer.

Initially, sensor data at a given priority level X is sent from a sensor (such as sensor 12a from FIG. 2) to a computing device (such as computing device 11a from FIG. 2) in a time multiplexed manner (step A). Because the data is time stamped by the receiving computing device using its system wide synchronized value from System Timer Value register 72, the data does not have to strictly alternate to each destination, allowing for possible simplification or distribution of the source device. Each of the four computing devices stores the data it receives into its own priority queue X and stores a time stamp based on its system timer value (such as system timer value 72) and, optionally, Frame Count register (such as Frame Count register 73) (Step B). This creates a single logical priority X queue that physically distributes across all four computing devices. The data from data queue X may later be retrieved in time of arrival order. One of the four computing devices, which acts as a master computing device, queries each of the three remaining computing devices to obtain reports of what priority queues they have active and what time stamp range they hold for each data queue (Step C). The master computing device then issues commands to the corresponding computing devices directing which priority queue(s) to transmit over the target communications link, for what time stamp range and at what rate (under Throttle register 25 control) (Step D). Each of the three computing devices then begins its transmission for a given priority queue X in proper sequence as directed by the master computing device, thus preserving time of arrival order (Step E). The total bandwidth of the communications link can also be logically partitioned using the value in Throttle register 25 so that other data can be simultaneously transmitted using a portion of the bandwidth not assigned to priority queue X.

Alternatively, the functions of sending queries to the computing devices, determining the queue(s) priorities to transmit, the time stamp ranges to use and the bandwidth to assign to each of the computing devices are performed by an assigned slave computing device or another type of computational device altogether such as a system control processor.

Alternately, the device used to determine the queue(s) priorities to transmit, the time stamp ranges to use and the bandwidth to assign to each of the computing devices can build an ordered list of assignments for each computing device and send that list to the computing device assigned to transmit first. Once that device completes its transmission it deletes its command and sends the list to the next device in the list. That device repeats the process and the final device on the list sends a completion message back to the original command generation device.

As another example, system timer 81 or 82 may allow the resource shared by all of the computing devices to be allocated in the time domain. In this example, each of the four computing devices can be assigned a time slot when it can used the shared device. The use of Throttle register 25 (from FIG. 2) can be used to suppress notification of data availability until the assigned time slot is active. The synchronization capabilities of the system timer 81 or 82 means that all of the four computing devices agree when that time slot is available. There are many ways system timer 81 or 82 can be used but one approach would be for Throttle register 25 to be set to a value that corresponds to when the time window is next available (being set to 0, if the time slot is currently active).

As has been described, the present invention provides an apparatus for managing distributed data queues within a network.

While the invention has been particularly shown and described with reference to a preferred embodiment, it will be understood by those skilled in the art that various changes in form and detail may be made therein without departing from the spirit and scope of the invention.

What is claimed is:

1. An apparatus comprising:
   one or more sensors for collecting data;
   a set of data queues;
   a data interface for transferring said collected data from said one or more sensors to said set of data queues; and
   a priority sieve for organizing said set of data queues according to data priority of a specific task, wherein said priority sieve includes:
      a scoreboard having a plurality of pages, each containing a set of registers associated with one of said data queues, and
      a shared register bank having a plurality of registers for storing a synopsis of contents of said scoreboard; and
   wherein said priority sieve to determines one of said data queues to have a higher priority over said remaining data queues based on said synopsis such that data in said one data queue are to be sent to a data processing system for further processing before sending data from said remaining data queues to said data processing system.

2. The apparatus of claim 1, wherein each of said data queue is associated with a priority number.

3. The apparatus of claim 1, wherein said priority sieve discards data from one of said data queues in response to additional data coming into said one data queue when said one data queue is full.

4. The apparatus of claim 1, wherein said priority sieve joins information with information from a second priority sieve located in a second apparatus to form a combined priority sieve.

5. A method for managing data, said method comprising:
   collecting data via one or more sensors;
   transferring said collected data from said one or more sensors to a set of data queues;
   organizing said set of data queues via a priority sieve, after said collected data have been placed within said set of data queues, according to data priority of a specific task, wherein said priority sieve includes:
      a scoreboard having a plurality of pages, each containing a set of registers associated with one of said data queues, and
      a shared register bank having a plurality of registers for storing a synopsis of contents of said scoreboard; and
   determining one of said data queues to have a higher priority over said remaining data queues based on said synopsis such that data in said one data queue are to be sent to a data processing system for further processing before sending data from said remaining data queues to said data processing system.

6. The method of claim 5, wherein said each of said data queue is associated with a priority number.

7. The method of claim 5, wherein further comprising discarding data from one of said data queues in response to additional data coming into said one data queue when said one data queue is full.

* * * * *